(12) United States Patent
Gong

(10) Patent No.: US 7,398,199 B2
(45) Date of Patent: Jul. 8, 2008

(54) CHINESE ROMANIZATION

(75) Inventor: Xue Sheng Gong, 61A Euclid Ave., Toronto, Ontario (CA) M6J 2J8

(73) Assignee: Xue Sheng Gong, Toronto, ON (CA)

( * ) Notice: Subject to any disclaimer, the term of this patent is extended or adjusted under 35 U.S.C. 154(b) by 827 days.

(21) Appl. No.: 10/806,366

(22) Filed: Mar. 23, 2004

(65) Prior Publication Data

US 2005/0222838 A1 Oct. 6, 2005

(51) Int. Cl.
*G06F 17/20* (2006.01)
*G06F 17/21* (2006.01)

(52) U.S. Cl. .......................................... 704/8; 715/535

(58) Field of Classification Search ................ 704/8; 715/535
See application file for complete search history.

(56) References Cited

U.S. PATENT DOCUMENTS

| | | | | |
|---|---|---|---|---|
| 5,832,478 A * | 11/1998 | George | ........................ | 707/3 |
| 5,893,133 A * | 4/1999 | Chen | ........................ | 715/535 |
| 5,995,934 A * | 11/1999 | Tang | ........................ | 704/270 |
| 6,073,146 A * | 6/2000 | Chen | ........................ | 715/264 |
| 6,587,819 B1 * | 7/2003 | Lu | ........................ | 704/257 |

FOREIGN PATENT DOCUMENTS

| | | |
|---|---|---|
| CN | 02108930.2 | 4/2003 |
| CN | 03108550.4 | 11/2003 |

* cited by examiner

*Primary Examiner*—David Hudspeth
*Assistant Examiner*—Justin W. Rider

(57) ABSTRACT

The invention disclose: Chinese spelling scheme, Chinese alphabetic writing and Phonetic Symbols scheme. The Chinese spelling scheme which is used English letters to mark the tones, it is reduced to 5 sound symbols of the monosyllabic words from 6 spelling letters of other schemes at most. Between the syllables is clearly demarcated. It can be used as marks in sound and tone for Chinese characters, and also can form an alphabetic writing independently which follows the law of international languages. It's highly integrated with word, sound, and code which can be displayed each other and converted each other. It can be translated directly with the Chinese-language sentence and foreign languages. The Phonetic Symbols do not go beyond the range of 26 letters and symbols of common used English keyboard, which can not only be used to mark in English and other languages, but also can be used as a phonetic symbol written language independently.

17 Claims, 3 Drawing Sheets

Gugq's Chinese Spelling Scheme

| | | | | | | | | | | | | | |
|---|---|---|---|---|---|---|---|---|---|---|---|---|---|
| ㄅ | b | ㄐ | j | | | 丨 | -i | i | ㄨ | -u | u | ㄩ | -y | y |
| 玻 | [p] | 基 | [tɕ] | | | 衣 | | [i] | 乌 | | [u] | 迂 | | [y] |
| ㄆ | p | ㄑ | ch | ㄚ | a | 丨ㄚ | -ia | ia | ㄨㄚ | -ua | ua | | | |
| 坡 | [pʰ] | 其 | [tɕʰ] | 啊 | [a] | 呀 | | [ia] | 蛙 | | [ua] | | | |
| ㄇ | m | ㄒ | sh | ㄛ | o | 丨ㄛ | | io | ㄨㄛ | -uo | uo | | | |
| 莫 | [m] | 希 | [ɕ] | 喔 | [o] | 哟 | | [io] | 窝 | | [uo] | | | |
| ㄈ | f | ㄓ | zr | ㄜ | e | | | | | | | | | |
| 复 | [f] | 知 | [tʂ] | 鹅 | [ə] | | | | | | | | | |
| ㄉ | d | ㄔ | cr | ㄝ | e^ | 丨ㄝ | -ie | ie | | | | ㄩㄝ | -ye | ye |
| 得 | [t] | 吃 | [tʂʰ] | 欸 | [ɛ] | 耶 | | [iɛ] | | | | 约 | | [yɛ] |
| ㄊ | t | ㄕ | sr | ㄞ | ai | | | | ㄨㄞ | -uai | uai | | | |
| 特 | [tʰ] | 诗 | [ʂ] | 哀 | [ai] | | | | 歪 | | [uai] | | | |
| ㄋ | n | ㄖ | r | ㄟ | ei | | | | ㄨㄟ | -ui | ui | | | |
| 讷 | [n] | 日 | [z] | 欸 | [ei] | | | | 威 | | [uei] | | | |
| ㄌ | l | ㄗ | z | ㄠ | au | 丨ㄠ | -iau | iau | | | | | | |
| 勒 | [l] | 资 | [ts] | 敖 | [au] | 腰 | | [iau] | | | | | | |
| ㄍ | g | ㄘ | c | ㄡ | eu | 丨ㄡ | -iu | iu | | | | | | |
| 哥 | [k] | 次 | [tsʰ] | 欧 | [əu] | 优 | | [iəu] | | | | | | |
| ㄎ | k | ㄙ | s | ㄢ | an | 丨ㄢ | -ian | ian | ㄨㄢ | -uan | uan | ㄩㄢ | -yan | yan |
| 科 | [kʰ] | 思 | [s] | 安 | [an] | 烟 | | [ian] | 弯 | | [uan] | 冤 | | [yan] |
| ㄏ | h | | | ㄣ | en | 丨ㄣ | -in | in | ㄨㄣ | -un | un | ㄩㄣ | -yn | yn |
| 喝 | [x] | | | 恩 | [ən] | 因 | | [in] | 温 | | [un] | 晕 | | [yn] |
| | | | | ㄤ | ag | 丨ㄤ | -iag | iag | ㄨㄤ | -uag | uag | | | |
| | | | | 昂 | [aŋ] | 央 | | [iaŋ] | 汪 | | [uaŋ] | | | |
| | | | | ㄥ | eg | 丨ㄥ | -ig | ig | ㄨㄥ | -ug | ug | ㄩㄥ | -yg | yg |
| | | | | 鞥 | [əŋ] | 英 | | [iŋ] | 翁 | | [uŋ] | 雍 | | [yŋ] |
| | | | | ㄦ | er | | | | | | | | | |
| | | | | 儿 | [ər] | | | | | | | | | |

Note: In every unit--
First line: Phonetic Symbol; Gugq's Chinese Spelling.
Second line: Chinese Character; IPA.

FIG. 1

Gugq's Chinese Spelling Scheme

| | | | | | | | | | | | |
|---|---|---|---|---|---|---|---|---|---|---|---|
| ㄅ | b | ㄐ | j | | | ㄧ | -i | i | ㄨ | -u | u |
| 玻 | [p] | 基 | [tɕ] | | | 衣 | | [i] | 乌 | | [u] |
| ㄆ | p | ㄑ | ch | ㄚ | a | ㄧㄚ | -ia | ia | ㄨㄚ | -ua | ua |
| 坡 | [pʰ] | 其 | [tɕʰ] | 啊 | [a] | 呀 | | [ia] | 蛙 | | [ua] |
| ㄇ | m | ㄒ | sh | ㄛ | o | ㄧㄛ | | io | ㄨㄛ | -uo | uo |
| 莫 | [m] | 希 | [ɕ] | 喔 | [o] | 哟 | | [io] | 窝 | | [uo] |
| ㄈ | f | ㄓ | zr | ㄜ | e | | | | | | |
| 复 | [f] | 知 | [tʂ] | 鹅 | [ə] | | | | | | |
| ㄉ | d | ㄔ | cr | ㄝ | e^ | ㄧㄝ | -ie | ie | | ㄩㄝ | -ye | ye |
| 得 | [t] | 吃 | [tʂʰ] | 欸 | [ɛ] | 耶 | | [iɛ] | 约 | | [yɛ] |
| ㄊ | t | ㄕ | sr | ㄞ | ai | | | | ㄨㄞ | -uai | uai |
| 特 | [tʰ] | 诗 | [s] | 哀 | [ai] | | | | 歪 | | [uai] |
| ㄋ | n | ㄖ | r | ㄟ | ei | | | | ㄨㄟ | -ui | ui |
| 讷 | [n] | 日 | [z] | 欸 | [ei] | | | | 威 | | [uei] |
| ㄌ | l | ㄗ | z | ㄠ | au | ㄧㄠ | -iau | iau | | | |
| 勒 | [l] | 资 | [ts] | 敖 | [au] | 腰 | | [iau] | | | |
| ㄍ | g | ㄘ | c | ㄡ | eu | ㄧㄡ | -iu | iu | | | |
| 哥 | [k] | 次 | [tsʰ] | 欧 | [əu] | 优 | | [iəu] | | | |
| ㄎ | k | ㄙ | s | ㄢ | an | ㄧㄢ | -ian | ian | ㄨㄢ | -uan | uan | ㄩㄢ | -yan | yan |
| 科 | [kʰ] | 思 | [s] | 安 | [an] | 烟 | | [ian] | 弯 | | [uan] | 冤 | | [yan] |
| ㄏ | h | | | ㄣ | en | ㄧㄣ | -in | in | ㄨㄣ | -un | un | ㄩㄣ | -yn | yn |
| 喝 | [x] | | | 恩 | [ən] | 因 | | [in] | 温 | | [un] | 晕 | | [yn] |
| | | | | ㄤ | ag | ㄧㄤ | -iag | iag | ㄨㄤ | -uag | uag | | | |
| | | | | 昂 | [aŋ] | 央 | | [iaŋ] | 汪 | | [uaŋ] | | | |
| | | | | ㄥ | eg | ㄧㄥ | -ig | ig | ㄨㄥ | -ug | ug | ㄩㄥ | -yg | yg |
| | | | | 鞥 | [əŋ] | 英 | | [iŋ] | 翁 | | [uŋ] | 雍 | | [yŋ] |
| | | | | ㄦ | er | | | | | | | | | |
| | | | | 儿 | [ər] | | | | | | | | | |

Note: In every unit--
  First line: Phonetic Symbol; Gugq's Chinese Spelling.
  Second line: Chinese Character; IPA.

FIG. 2

Contrast of some syllables of 3 Chinese spelling

| Sample Word | Gugq Pinqinq | Hanyu Pinyin | Tongyong Pinyin | Sample Word | Gugq Pinqinq | Hanyu Pinyin | Tongyong Pinyin | Sample Word | Gugq Pinqinq | Hanyu Pinyin | Tongyong Pinyin |
|---|---|---|---|---|---|---|---|---|---|---|---|
| 昂 | ag | ang | ang | 有 | iu | you | you | 朋 | pug | peng | peng |
| 奥 | au | ao | ao | 机 | j | ji | ji | 日 | r | ri | rih |
| 波 | b | bo | bo | 家 | ja | jia | jia | 让 | rag | rang | rang |
| 帮 | bag | bang | bang | 江 | jag | jiang | jiang | 仍 | reg | reng | reng |
| 崩 | bug | beng | beng | 见 | jan | jian | jian | 容 | rug | rong | rong |
| 并 | big | bing | bing | 交 | jau | jiao | jiao | 瑞 | rui | rui | rui |
| 此 | c | ci | cih | 节 | je | jie | jie | 思 | s | si | sih |
| 苍 | cag | cang | cang | 经 | jig | jing | jing | 桑 | sag | sang | sang |
| 层 | ceg | ceng | ceng | 金 | jin | jin | jin | 僧 | seg | seng | seng |
| 从 | cug | cong | cong | 九 | jeu | jiu | jiou | 送 | sug | song | song |
| 翠 | cui | cui | cuei | 居 | jy | ju | jyu | 虽 | sui | sui | suei |
| 起 | ch | qi | ci | 卷 | jyan | juan | jyuan | 西 | sh | xi | si |
| 强 | chag | qiang | ciang | 决 | jye | jue | jyue | 想 | shag | xang | siang |
| 情 | chig | qing | cing | 窘 | jyg | jiong | jyong | 星 | shig | xing | sing |
| 穷 | chyg | qiong | cyong | 军 | jyn | jun | jun | 兄 | shyg | xiong | syong |
| 吃 | cr | chi | chih | 可 | k | ke | ke | 是 | sr | shi | shih |
| 昌 | crag | chang | chang | 康 | kag | kang | kang | 胜 | sreg | sheng | sheng |
| 成 | creg | cheng | cheng | 空 | kug | kong | kong | 水 | srui | shui | shuei |
| 创 | cruag | chuang | chuang | 亏 | kui | kui | kuei | 特 | t | te | te |
| 充 | crug | chong | chong | 乐 | l | le | le | 腾 | teg | teng | teng |
| 吹 | crui | chui | chuei | 浪 | lag | lang | lang | 听 | tig | ting | ting |
| 得 | d | de | de | 冷 | leg | leng | leng | 同 | tug | tong | tong |
| 当 | dag | dang | dang | 令 | lig | ling | ling | 无 | u | wu | wu |
| 等 | deg | deng | deng | 流 | liu | liu | liou | 王 | uag | wang | wang |
| 动 | dug | dong | dong | 路 | lu | lu | lu | 翁 | ug | weng | wong |
| 对 | dui | dui | duei | 龙 | lug | long | long | 为 | ui | wei | wei |
| 服 | f | fu | fu | 律 | ly | lu | lyu | 文 | un | wen | wun |
| 方 | fag | fang | fang | 略 | lye | lue | lyue | 语 | y | yu | yu |
| 风 | fug | feng | fong | 莫 | m | mo | mo | 原 | yan | yuan | yuan |
| 个 | g | ge | ge | 忙 | mag | mang | mang | 用 | yg | yong | yong |
| 港 | gag | gang | gang | 梦 | mug | meng | meng | 运 | yn | yun | yun |
| 公 | gug | Gugq | Gugq | 明 | mig | ming | ming | 子 | z | zi | zih |
| 规 | gui | gui | guei | 呢 | n | ne | ne | 葬 | zag | zang | zang |
| 和 | h | he | he | 囊 | nag | nang | nang | 赠 | zeg | zeng | zeng |
| 航 | hag | hang | hang | 娘 | niag | niang | niang | 总 | zug | zong | zong |
| 横 | heg | heng | heng | 宁 | nig | ning | ning | 最 | zui | zui | zuei |
| 红 | hug | hong | hong | 农 | nug | nong | nong | 之 | zr | zhi | jhih |
| 会 | hui | hui | huei | 女 | ny | nu | nyu | 张 | zrag | zhang | jhang |
| 衣 | i | yi | yi | 虐 | nye | nue | nyue | 庄 | zruag | zhuang | jhuang |
| 杨 | iag | yang | yang | 破 | p | po | po | 中 | zrug | zhong | jhong |
| 英 | ig | ying | ying | 旁 | pag | pang | pang | 追 | zrui | zhui | jhui |

FIG. 3

Corresponding Phonetic Symbols

| Gugq | IPA | KK | Webster | Oxford | Ex. Words | Gugq | IPA | KK | Webster | Oxford | Ex. Words |
|---|---|---|---|---|---|---|---|---|---|---|---|
| ii | iː | i | 'ē, ˌē | ē | meet | p | p | p | p | p | pen |
| i | ɪ | ɪ | i, ə, ē | ĭ | city | b | b | b | b | b | bad |
| ec | e | ɛ | e | ĕ | bed | t | t | t | t | t | tea |
| ac | æ | æ | a, aa | ă | mat | d | d | d | d | d | desk |
| ee | ɜː (r) | ɝ | ər | ēr | bird | k | k | k | k | k | cat |
| e | ə | ə | ə | a,e,i,o,u | token | g | g | g | g | g | game |
| er | ə (r) | ɚ | ə (r) | er | later | w | w | w | w | w | we |
| oc | ʌ | ʌ | 'ə, ˌə | ŭ | dug | f | f | f | f | f | fall |
| uu | uː | u | ü | ōō | blue | v | v | v | v | v | voice |
| u | ʊ | ʊ | ů | ŏŏ | put | th | θ | θ | th | th | bath |
| oo | ɔː | ɔ | ȯ | aw | saw | dh | ð | ð | <u>th</u> | dh | with |
| or | ɔː (r) | ɔr | ȯ (ə)r | ōr | door | s | s | s | s | s | so |
| a | ɒ | ɑ | ä | ŏ | hot | z | z | z | z | z | zoo |
| aa | ɑː | ɑ | ä, à | ah | calm | r | r | r | r | r | red |
| ar | ɑː (r) | ɑr | är, à (r) | är | far | sh | ʃ | ʃ | sh | sh | ship |
| ei | eɪ | e | ā | ā | bay | zh | ʒ | ʒ | zh | zh | azure |
| ai | aɪ | aɪ | ī | ī | my | y | j | j | y | y | yes |
| oi | ɔɪ | ɔɪ | oi | oi | boy | h | h | h | h | h | how |
| eu | əʊ | o | ō | ō | go | m | m | m | m | m | him |
| au | aʊ | aʊ | aů | ow | now | em | m | m̩ | ᵊm | əm | keep<u>e</u> |
| ir | ɪə (r) | ɪr | i (ə)r | ēr | pear | n | n | n | n | n | no |
| ecr | eə (r) | ɛr | a (a)(ə)r | ār | care | en | n | n̩ | ᵊn | ən | Ede<u>n</u> |
| ur | ʊə (r) | ʊr | ů ə (r) | oor | poor | ng | ŋ | ŋ | ŋ | ng | long |
| air | aɪə (r) | aɪr | ī (ə) r | īr | fire | l | l | l | l | l | leg |
| aur | aʊə (r) | aʊr | aů (ə)r | owr | hour | el | l | l̩ | ᵊl | əl | crad<u>le</u> |
| juu | juː | ju | yü | ū | yo<u>uth</u> | ch | tʃ | tʃ | ch | ch | catch |
| jur | jʊə (r) | jʊr | y ů (ə)r | ūr | lure | j | dʒ | dʒ | j | j | ju<u>dge</u> |

CHINESE ROMANIZATION

BACKGROUND OF THE INVENTION

1. Field of the Invention

This scheme relates to a kind of Gugq's Chinese Spelling scheme, Gugq's Chinese Alphabetic Writing scheme an Gugq's Phonetic Symbols scheme. Gugq's Chinese Spelling and Gugq's Phonetic Symbols do not go beyond the range of 26 letters and symbols in the commonly used general English keyboard. Gugq's Chinese Spelling can be used not only in the marking of sound and tone of the Chinese characters, but also can form an alphabetic writing independently. It matches international languages, and makes word, sound and code highly integrated. The Chinese characters and Gugq's Chinese Spelling words can be displayed and converted into each other. Gugq's Phonetic Symbols not only can be used to mark English, and other languages, but also can form the phonetic symbol writing independently.

2. Description of the Prior Art

The Chinese character (Chinese square picture character) is one of the oldest characters in the world. At present, according to relevant statistics, the population of using the Chinese character accounts for more than 36% of the total population in the world. In Chinese characters, there are about 1,550 Chinese character components (shape and sound components), which are made from five kinds of basic strokes. Then more than 100,000 Chinese characters are made up from these basic character components. The amount of Chinese characters have accumulated up to 150,000 from ancient times to the present (The Chinese-language Variant Form of Chinese Character Dictionary collected 106,152 characters).

The GB Code 18030-2000 which is used in Chinese Mainland has 27,533 characters, the Big5+ Code used in Taiwan has collected 51,585 characters. In addition, on the basis of Big5, "The Hong Kong Augmented Character Collection" used in Hong Kong has added 4,702 Chinese characters including dialects of Guangzhou, which is used together with Big5. Chinese characters and English letters are the most basic units of the spoken and written languages. Vocabularies and sentences which transmit different kinds of information are formed from the units. We can say they are the carrier of information. In order to make the quantitative analysis for every Chinese character or English letter of carried messages, modern informatics weigh up the average amount of information with entropy. Entropy shows the uncertainty of a symbol appearing. The unit used is a Bit. Some linguists get a conclusion through calculating, which says the entropy of an English letter is 4.03 Bits (in alphabetic writing a letter is usually within 4.35 Bits), while the entropy of a Chinese character is 9.65 Bits. This indicates that a Chinese character needs more space for storage and more time for transmission. An alphabetic writing which has much less symbols, words with letter combinations spells one-dimensionally in a linear permutation from left to right. But the Chinese character has too many symbols, combinations of strokes and components which make up a two-dimensional surface type "square". There is much higher degree of difficulty than alphabetic writing in teaching, using, machine translation etc.

Every character of the Chinese character is a picture. Mostly, between the pictures there are no rules to follow. The shortcoming of the Chinese character can be rated "three in quantities and five in difficulties": Large quantity of characters, strokes, pronunciations, therefore it is difficult to recognize, read, write, remember and use. The Chinese character can not be input through the commonly used English keyboard directly. That's why there are about 6,000 kinds of Chinese character inputting methods. In China, Taiwan and Hong Kong, every organization has to hire a professional "typist" to input Chinese characters into a computer. Most of the none-spoken Chinese people studying the Chinese character have little success even though they try for many years. People describing something very difficult, would say "As difficult as learning Chinese".

According to a relevant study about the simplified Chinese character used in Chinese Mainland, to compare learning the Chinese character with only learning alphabetic writing, one should spend four more years in one's life to learn the Chinese character. Meanwhile, one must often "keep reciting to remember from time to time" in order to maintain the degree of familiarity in reading and writing Chinese characters. In fact, this way of "forced to remember" has run through each user's life. Some relevant results of study indicate that the reading amount of children under the age of 8 in English speaking and writing nations is equivalent to 6 times that of the children of the same age in China.

According to the recent statistics that the Chinese Ministry of Education announced in China, the adult illiteracy rate of Chinese Mainland account for 8.72% of the adult population. The illiterate number is up to 85 millions, and the whole country has the trend of increasing about 500,000 illiterates every year. That means in China there is one of every 10 illiterate of the world. There is one illiterate of 15 Chinese— the direct reason is because of the complicatedness of the Chinese character. The national power of many countries is weaker than that of China, but because of using alphabetic writing, the illiteracy rate is much lower than China.

The international community has to pay a price for the Chinese character too. If disregarded symbols and private codes, among Unicode, the system of spelling, syllable, and pronunciation of the world only 8,192 points need to be distributed, but in the only one language which is not writing with letters—the Chinese character, 45,056 points need to be distributed. Some language philologists say: "the Chinese character is the last living fossil in the human characters' history"; "Entering the era of information, the using of the Chinese character has already become the irrational, inefficient primitive mode".

The scheme of the Chinese Phonetic transcription (Hanyu Pinyin) which is used now in Chinese mainland was made out in 1958, it was developed on the basis of various kinds of phonetic notation rules of the past. In order to solve the problem of too complicated Chinese characters, from 1950s the Chinese government had been organizing a lot of reform experts to launch the design of "alphabetic writing of Chinese". Decades passed, huge manpower and money were spent on it. The Committee for Reforming the Chinese Written Language had altogether received 655 kinds of schemes for the Chinese Phonetic transcription which were referred by the people from all walks of life. And more than 4,000 letters from the domestic and international masses. But the committee failed to obtain a satisfactory result, then declared to give up finally. So the subject of Chinese alphabetic writing is the very difficult problem that the numerous Chinese characters experts failed to solve.

Both of "The scheme of Hanyu Pinyin (which is used in Chinese mainland)" and "The scheme of Tongyong Pinyin (which is used in Taiwan)", have the similarity up to more than 85%. The commonly used computer keyboard is designed by English letters, because of the tone marks: ́ ,  ̌ , ̀ , in "Hanyu Pinyin" and "Tongyong Pinyin", and the simple vowel ü in "Hanyu Pinyin", there is no way for directly inputting. The letters or the letter combinations (such as: q, x, zh, ch, sh, ao, ou, ong, etc.), do not correspond to the spelling rules of the International Phonetic Symbols, and there are too many differences from the pronunciations of English spelling. At present, the scheme of "Hanyu Pinyin" has left only one function which is to mark the tones for the Chinese character. In fact, both of "Hanyu Pinyin" and "Tongyong Pinyin" are just semi-Romanized schemes, they can't be integrated with the international spoken and written languages due to various reasons.

In Chinese alphabetic writing, the spelling of the quoted non-Chinese words and phrases should return to the form of original Latin alphabet, and the pronunciations should be marked with phonetic symbols if necessary. At present, English and the world's other main languages have commonly used phonetic notation systems such as: IPA, KK, Webster, Oxford etc. The existing Chinese phonetic notation systems have a lot of letters and symbols which cannot be directly input in the commonly used English keyboard, and bring inconvenience to users in the whole world.

Therefore no matter in China, or in the international community, a standard Chinese alphabetic writing and a special kind of phonetic symbols are needed urgently to match the standard English keyboard for directly inputting, and to accord with the current international language spelling. Furthermore, because the pronunciations and spellings of English or other languages do not always correspond, one way is needed to turn an international popular language into an international phonetic symbol writing at the same time.

In most of syllables of Chinese characters, one syllable corresponds to a lot of monosyllabic characters. In fact, each square character is a monosyllable. Right now, there are 415 syllabic forms (the 4 tone marks neglected) for spelling the square characters. If spelling with the 415 syllables, there are lots of corresponding characters at the same shape spelling (repeated codes). In commonly used contemporary Chinese, the vocabularies are nearly 50,000. If spelling these 50,000 words with 415 syllabic forms, the same shape spelling words are nearly 15,000, the proportion is 30%; If spelling in the form of 1,350 syllables (with tone marks), the same shape spelling words are still nearly 4000, the proportion is 8%. As we know, even spelling with tone marks, the proportion of the same shape words is still very high; Because of the wording uniqueness in a much higher degree, the Indo-European family languages have only about 3% in proportion of the same shape words.

Some Chinese alphabetic writing schemes once used with "a different way of spelling" to split up the words and form a pattern of each word for the same sound with the same tone words, namely many kinds of spelling ways were used for the same syllable (for instance: cao, the different spellings were "cau, caw, tsao, tsau, tsow, tzao, tzau, tzaw, ccao, ccau, ccaw", etc.). If using dozens of different spelling forms to split up and form an unique pattern for each word for every Chinese syllable and using the same way for several tens of thousands of words and phrases of the Chinese language, learners need to spend a lot of time to get forced to remember the very large amount of the designated words, it is very hard for them to bear the burden in memory. Therefore the Chinese alphabetic writing should use a scientific method to split up and form an unique pattern for each word effectively without using "different letters combination spelling" to discriminate the monosyllable and multiple syllabic words with the same sound and the same tone (homonym). The Chinese alphabetic writing must be very easy and accurate in two-way machine translation with a popular language such as English in the world.

SUMMARY OF THE INVENTION

Therefore, this scheme offers one called Gugq's Chinese Spelling scheme, which are including 4 special-purpose letters and one symbol to mark the tones for Chinese characters. All the letters used are not beyond the range of 26 letters and symbols in the commonly used English keyboard. It is not only in accord with the habitual usage of the current spelling scheme but also close to the standard spelling of the Indo-European family of languages. It is easy to learn and remember, the spelling type is simple, the demarcation of the syllable is clear. It can reduce to 5 sound letters from 6 of Hanyu Pinyin, Tongyong Pinyin, or Yale's monosyllable, and from 7 of Well's. It can also drop to 2.97 on average on monosyllabic sound letters from 3.23 of Hanyu Pinyin, or 3.35 of Tongyong Pinyin.

This scheme offers one called Gugq's Chinese Alphabetic Writing that integrates totally with international spoken and written languages. Without using the different spelling forms that are hard to memorize, the words are highly integrated with sounds and codes that can be displayed and converted into each other. Through an effective method to split up and form an unique pattern of each word for the same sound and tone words, the whole Romanized Gugq's Alphabetic Writing has a complete spelling system with law accuracy and has the following merits: sound uniqueness (one word corresponds only one pronunciation); big difference of the shape (different words have quite different spellings); fast reading rate; unambiguous in meaning. A succinct and vivid alphabetic writing system which is more efficient than English and other Indo-European family of languages. Directly through machine translating, it can get an accurate result between Chinese characters and English or the world's popular languages.

This scheme offers one called Gugq's Phonetic Symbols. The phonetic symbol letters do not go beyond 26 letters in the commonly used English keyboard. All phonetic symbols will not produce any confusion, or mistakes of reading. Gugq's Phonetic Symbols can be not only used as marking the pronunciation of words in English, and other Indo-European languages, but also can form a phonetic symbol writing independently. It can make a whole article phonetically symbolized.

BRIEF DESCRIPTION OF THE DRAWINGS

A more complete application of this scheme, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a table showing Gugq's Chinese Spelling scheme. In every unit, the first line is mark symbol and Gugq's Chinese Spelling. The corresponding Chinese character is second line, in the square brackets is IPA (the International Phonetic Symbols).

FIG. 2 is a contrast of some syllables of Gugq's spelling with Hanyu Pinyin and Tongyong Pinyin.

FIG. 3 is a contrast of Gugq's Phonetic Symbols with "IPA, KK, Webster, Oxford".

DETAILED DESCRIPTION OF THE PREFERRED EMBODIMENTS

In the overall scheme of Gugq's Chinese Spelling, all sound letters and tone letters don't go beyond the range of 26

English letters and English keyboard symbols. Only letting the integrated Chinese spelling scheme and Chinese alphabetic writing match the international spoken and written languages, could make it easy for Chinese people to study foreign languages and non-Chinese people to learn Chinese, and could let Chinese language go to the world. Please see FIG. 1 for reference of Gugq's Chinese Spelling in details.

"The Chinese spelling scheme—Hanyu Pinyin" which is used in Chinese Mainland, and "The Common spelling scheme—Tongyong Pinyin" that is used in Taiwan, are more than 85% in similarity, please see FIG. 2 for the three schemes detailed to compare "the contrast of some syllables between Gugq's Chinese Spelling, Hanyu Pinyin and Tongyong Pinyin".

Try to be close to the spelling form of the International Phonetic Symbols and to correspond routines of the Latin alphabets; To find out that the closest corresponding relation with the initial consonants and vowels of a Chinese syllable pronunciation from the clear consonants and turbid consonants and vowels of the International Phonetic Symbols; Then to find out and select the International Phonetic Symbols pronounced the closest to, and "appearing with the highest frequency" routine of English spelling form or other popular international languages.

The vowel Ü in Hanyu Pinyin cannot be input directly at English keyboard; Tongyong Pinyin use YU instead of Ü, but spending one pair of letters to show the single simple vowel does not conform to the common usage. Gugq's Chinese Spelling expresses the sound with single letter Y, and it is identical with the International Phonetic Symbol. In order to avoid confusion, Y is not used using for any other function.

There are three kinds of pronunciations for letter U in English: [ʌ], [u] and [ju], adopt only [u] in pronunciation in Chinese. According to the only one pronunciation [u], ONG→UNG [uŋ] is a scientific way. Use AU [au] to replace AO, EU [ʌu] to replace OU, because AU & EU are closer to the International Phonetic Symbols' pronunciation and standard English spelling form. In the alphabet, the pronunciation of F is adjusted from FO to FU; Use EH to replace Ê [ɛ], after vowel I or Ü, use E instead.

X tone in Hanyu Pinyin is pronounced [ks] in English. SH is [ʃ] which otherwise is similar to the sound X of Hanyu Pinyin. CH in English is [tʃ] which is similar to Q of Hanyu Pinyin. Tongyong Pinyin replaces Q, X of Hanyu Pinyin respectively with CI, SI, and replaces CI, SI of Hanyu Pinyin respectively with CIH SIH, the two schemes are very easy to get confused, Gugq's Chinese Spelling uses as Q.→CH, X→SH.

Like other vowel letters, the letter I has an only one pronunciation "衣" in the spelling of Chinese language, therefore the syllables of Hanyu Pinyin such as ZHI, CHI, SHI, RI, ZI, CI, SI don't exist in modern Chinese pronunciations. Tongyong Pinyin uses JHIH, CHIH, SHIH, RIH, ZIH, CIH, SIH instead which on one hand extend the spelling length, on the other hand go beyond from the actual pronunciations of the Chinese language. The vowel of a Chinese syllable of ZH, CH, SH, R is close to the Symbolʅ, the vowel of a Chinese syllable of Z, C, S is close to [ɿ], there is not a suitable letter among the 26 letters of English that can correspond to the sounds, it is better to neglect the vowels when spelling the monosyllables which is conformed to the traditional Chinese alphabet. In Indo-European family of languages, the commonly used second-class letters are H, R, S for making up, and R has already been used as "日" sound in many kinds of spelling schemes. For corresponding and keeping related usage with R, Gugq's Chinese Spelling adjusts the three retroflex initial consonants: ZH.→ZR, CH→CR, SH→SR.

In modern Chinese pronunciations, the sounds such as: BENG [bəŋ], PENG [pəŋ], MENG [məŋ]FENG [fəŋ] in Hanyu Pinyin and Tongyong Pinyin do not exist, the mistakes can be found if FENG be divided into FE-NG and pronounced separately. Gugq's Chinese Spelling marks as: BUNG [buŋ], PUNG [puŋ], MUNG [muŋ], FUNG [fuŋ].

The vowel letters A, E, I in Chinese with the similar sound [n], [ŋ] in the International Phonetic Symbols can be respectively made up with the corresponding simple or compound vowels of a Chinese syllable, such as A [a]-AN [an]-ANG [aŋ], E [ə]-EN [ənn]-ENG [əŋ], I [i]-IN [in]-ING [iŋ]; The vowel letters U, Ü have the same corresponding relations too, but "wu-wen-weng, yu-yun-yong" of Hanyu Pinyin, "wu-wun-wong, yu-yun-yong" in Tongyong Pinyin and "wu-wen-weng, yu:-yun:-yung" of the Wade-Giles spelling, along with combinations of relevant initial consonants are not exactly corresponding forms. In Gugq's Chinese Spelling, to make up simple or compound vowel of a Chinese syllable form, all vowel letters closely followed by -N, -NG can correspond with the International Phonetic Symbols:

a [a] (伍) - an [an] (陆) - ag [aŋ] (柒) (捌)

e [ə] (玖) - en [ə] (佰) - eg [仟] (繗)

i [i] (亿) - in [in] (因) - ig [零] (玖拾贰元整)

u [u] (¥) - un [un] (叁仟伍佰零) - ug [捌元柒角肆分] (¥)

y [y] (机理, 肌理,) - yn [yn] (晕) - yg [吉利, 蒺藜,] (几粒, 祭礼,)

A commonly used computer keyboard is designed according to English letters. If the computer does not have an operating system of Chinese or a Chinese-language software, the tone marks of Hanyu Pinyin and Tongyong Pinyin can not be input directly. In Gugq's Chinese Spelling, the letters in an order of "O, V, W, X" have a special usage as four tone marks of standard Chinese pronunciation. The unstressed tone (soft tone) is marked as ('), and each tone mark follows each monosyllable. Except the soft tone is before a syllable, while arranging in order automatically by a computer, the same sound monosyllables can accord to the original order of the tone marks of the Chinese language (', q, v, w, x); The following is the contrast between the Gugq's Chinese Spelling mark method and the original tone marks:

| Tone 1 | Tone 2 | Tone 3 | Tone 4 | Unstressed Tone |
|---|---|---|---|---|
| q̄ | v́ | w̌ | x̀ | ' (no mark) |

In Hanyu Pinyin and Tongyong Pinyin, when a simple or compound vowel of a Chinese syllable forms a syllable alone, two kinds of contradictory are used. Some do not add any initial consonants such as A, AI, AN, ANG, AO, EI, EN, ENG, some add initial consonants (even change the spelling forms) which become WEN, WUN, WENG, WONG, WU, YI, YIN, YING (It may be the designers of the schemes who consider the two letters W, Y are idle and can be used, but if all added initial consonants, there are not enough letters available), among them WEN to UN, WENG to ONG have also changed the spelling forms. Because Gugq's Chinese Spelling uses special-purpose letters to mark tones, syllables demarcated clearly in between, in order to make the spelling simpler and the spelling form more standard, all monosyllables with the same simple or compound vowels are exempt any initial consonants, such as YI→I, WU→U, YIN→IN, WEN→UN, YUN→YN, YONG→YNG.

Being in the same monosyllables, if a vowel letter (Y is a vowel in Gugq's) is closely followed by -NG to form a simple or compound vowel of a Chinese syllable, omit for -G. It is easy to remember and can not be confused in this way, such as ANG→AG, ENG→EG, ING→IG, UNG→UG, YNG→YG. Omit IEU, UEI as IU, UI.

When each initial consonant is used independently, it is "regarded as" equivalent to its pronunciation in Chinese alphabet (the sound in the alphabet list), so it neither influences Chinese spelling and reading, nor gets confused (There are special-purpose letters to mark and separate them.), nor increases the memorized amount. Therefore the 3 initial consonants B, P, M are regarded as including O sound already: BO→B, PO→P, MO→M. The initial consonant F is regarded as including U sound already: FU→F. The 4 initial consonants of D, T, N, L are regarded as including E sound already: DE→D, TE→T, NE→N, LE→L. The 3 initial consonants G, K, H are regarded as including E sound already: GE→G, KE→K, HE→H. The 3 initial consonants J, CH, SH are regarded as including I sound already: JI→J, QI→CH, XI→SH, JIA→JA, QIAN→CHAN, XIANG→SHAG, JIAO→JAU, QIE→CHE.

While teaching the elementary course of Gugq's Chinese spelling, one can first mark according to the full spelling method, for instance BO, FU, DE, GE, JI, ANG, IEU, UEI, etc., then use the omission method to carry out the transition to B, F, D, G, J, AG, IU, UI.

Set in order using Gugq's Chinese Spelling: When arranging in an order, because of tone letters added, to prevent the same syllables with the same initial consonant and the same simple or compound vowel from separating (such as "niq 机理" before "niuv 肌理" but "niq 肌理" goes after "niuv 肌肤").

neglect the tone letters as the main key letters, and consider the tone letters as the secondary key letters (so the words mentioned above in order should be: "niq 妮" "nix 逆" "niuv 牛"); To prevent the initial consonant letters in pairs (CH, SH, ZR, CR, SR) from separating, and also take tone letters into consideration, use the method called "replace-sequencing-recovery": (1) Replace in the order of Q→1, V→2, W→3, X→4, CH→CWH, CR→CXR, SH→SWH, SR→SXR, ZR→ZXR; (2) Sequencing; (3) Recover according to CWH→CH, CXR→CR, SWH→SH, SXR→SR, ZXR→ZR, 1→Q, 2→V, 3→W, 4→X to get them return back; It is used in the order of: A, B, C, Ch, Cr, D, E, F, G, H, I, J, K, L, M, N, O, P, R, S, Sh, Sr, T, U, Y, Z, Zr for the index of syllables. This arranging method can be extensively used for many kinds of fields which involve the Chinese character and phonetic writings including dictionary of monosyllables or dictionary of words. Foreign library indexes can be arranged naturally in an order of the English letters because of many kinds of languages which need to be arranged synthetically.

The above-mentioned Gugq's Chinese Spelling scheme is in the range of 26 English letters, and close to standard Indo-European family of languages both in spelling and pronunciation. It uses special-purpose tone mark letters. The rule is easy to learn and memorize. The spelling type is simple, the syllables in between are clearly demarcated. It can be used in the marking of Chinese characters both for sound and tone (Please see the contrast in the following form). By knowing from the following table below, Gugq's Chinese Spelling reduces monosyllabic sound letters from 6 to 5 at most from Hanyu Pinyin and Tongyong Pinyin, from Hanyu Pinyin monosyllabic 3.23 letters and Tongyong Pinyin 3.35 letters to 2.97 on average. Those people who have learned Hanyu Pinyin or Tongyong Pinyin, only need to take several hours to learn the pronunciation rule of Gugq's Chinese Spelling scheme, and complete the conversion between different spelling schemes. For those who have learned Indo-European family of languages, just spending several hours to learn the pronunciation rule of Gugq's Chinese Spelling scheme, can pronounce the words in nearly perfect sounds.

|  | 1 Letter | 2 Letters | 3 Letters | 4 Letters | 5 Letters | 6 Letters | Average |
|---|---|---|---|---|---|---|---|
| Hanyu Pinyin | 5 | 80 | 172 | 124 | 25 | 3 | 3.23 |
| Tongyong Pinyin | 3 | 70 | 155 | 147 | 31 | 3 | 3.35 |
| Gugq's Pinqinq | 22 | 74 | 218 | 84 | 11 | 0 | 2.97 |

The actual application type of Gugq's Chinese Alphabetic Writing, is divided into "Marking Form" and "Writing Form" (The difference between the two forms is: no omitted spelling in marking form.). The marking form is not only used for marking the sound and tone of Chinese characters and the names of Chinese people, places, mountains and rivers or other non-paragraph publishing texts (such as all kinds of certificates, books, newspapers and periodical front covers, signposts, business signboards, goods stamps, domain names of internet of the Chinese language), it also can be used as alphabetical spelling form for beginners' or children's spelling reading materials.

Gugq's Chinese Alphabetic Writing is set up in the foundation of contemporary standard Chinese language instead of any Chinese dialects, in the foundation of contemporary writings in the vernacular instead of the writings in classical Chinese. Spoken language is a foundation of characters, but the Chinese-language written literary style of the Chinese character has adopted too much difference which is not existing in the spoken language. When spoken language and written literary style in Chinese writing have difference, the alphabetic writing gives priority to adopt the spoken usage; Gugq's Chinese Alphabetic Writing adopts international prevailing popular grammar system.

The whole scheme of Gugq's Chinese Alphabetic Writing considers primarily to be easy to study, easy to be understood, accurate pronunciation, not ambiguous, not much memory amount, and to meet with the convention of international spellings. Secondly the spelling type is simple, for making readers and listeners easy to understand, Gugq's Chinese Alphabetic Writing does not introduce any sounds and tones of dialects.

Completely marking all the tones is a necessary foundation. It can cause a large number of homonym problems if the tones are not marked; It is difficult to master a demarcation where to be marked if partly marked and partly not marked. Omitting tone marks or marking tones partly is set up on the basis of people who can speak standard Chinese language, but neglects the foreigners who want to learn Chinese, the overseas Chinese children and at home the numerous adults who speak inaccurately or cannot speak standard Chinese. Comparatively speaking, it is better to mark fully, although a bit more tedious, but it has the function of increasing the difference of visibility among the same sound syllables or words, it is also easier for reading. On the basis of all tones marked, for the words which tone marks can be omitted, omit the marks (such as the high-frequency sound omitted and tone omitted words).

Try to write according to a word. Among Chinese characters, most "characters" are monosyllabic units. Some characters can be regarded as words, some characters themselves do not have concrete meanings and only can be used after combined with other characters. Sometimes the same character, can serve as "word" alone under one meaning, but under another meaning it can just be made up and serve as "word" after being combined with other characters. For instance, the character "蝴" does not have any meaning, it can express the meaning of "蝴蝶 butterfly".

when it is together with the character "蝶"; Because "word" is a base unit of thinking, written by words is close to people's thought process, so there is little interference for thinking. Secondly, written by words can reduce large amount of the units of the same sound and same tone (because Chinese characters have different strokes in writing, they can't be confused by the same sound and same tone characters or words). Writing according to words can reduce the time for choosing which one is correct according to context. As to any disputes regarding division of a word, it can be written together if the word is within four characters, for instance:

位于uixyv, 生于sregqyv, 此前cwchanv, 其后chvheux, 开玩笑kaiquanvshaux, 成不了cregvbu'liauw.

Do not add any prefix or suffix. Some schemes use specific letters as prefix or suffix (or called grammatical prefix and suffix) to distinguish the parts of speech. In this way, the amount of memory would be increased in studying, and also it extends the length of the words. As a Chinese character is in monosyllabic form, Gugq's Chinese Alphabetic Writing adopts the way of "try to write according to a word", (the probability that input by words is far greater than the probability that input words by characters), and a lot of characters will become "prefix" or "suffix" automatically when input by words, such as

"电脑, 电影, 电灯, 电话, 电车, 电表, 电动机, 来电, 通电, 闪电, 停电, 无线电", for another example:

"花盆, 花坛, 花瓶, 花丛, 花农, 花团锦簇, 菊花, 梅花, 荷花, 桂花, 红花, 金银花", among them,

"dianx 电" and "huag 花"

are equivalent respectively to the prefix or suffix of Indo-European family of languages in the Chinese Alphabetic Writing.

Same monosyllables adopt omitted sound and tone form. For the characters with monosyllabic meanings (used as words but not affixes) at high-frequency usages such as the modal verb, directional verb, grammatical term for a character, pronoun, preposition, conjunction, auxiliary word, noun of locality, adverbial word, etc. which need to be split up and form an unique pattern for each word or grammatical distinction (only do statistics according to the relevant meanings of using as monosyllabic words, not including the relevant meanings of using as affixes, adopt omitted spelling form. For avoiding confusion, every combination of the same consonant letter(s) with the same simple or compound vowel of a Chinese syllable can only have one omitted sound and tone monosyllabic word. The following is the example for the sound and tone omitted monosyllabic words.

| Letters | b | p | m | f | d | t | n | l | g | k | h | j |
|---|---|---|---|---|---|---|---|---|---|---|---|---|
| Convention Words | 不 | 凭 | 没 | 非 | 的 | 他 | 你 | 了 | 过 | 可 | 和 | 就 |
| Measure Words | 部 | 片 | 名 | 份 | 道 | 天 | 年 | 类 | 个 | 口 | 盒 | 件 |

| Letters | r | z | c | s | a | o | e | i | u | y | | |
|---|---|---|---|---|---|---|---|---|---|---|---|---|
| Convention Words | 如 | 在 | 从 | 是 | 把 | 说 | 而 | 有 | 我 | 于 | | |
| Measure Words | 日 | 组 | 次 | 岁 | 条 | 所 | 本 | 页 | 位 | 月 | | |

Because Gugq's Chinese Spelling uses (') as unstressed tone mark, it cannot be confused with omitted sound and tone monosyllabic words. For the multi-sound characters such as "的, 地, 了, 都, 朝, 曾", etc. use omitted sound and tone form only at some relevant meanings of the parts of speech aforesaid, so that you can partly achieve the purpose for some monosyllables with high-frequency meanings to split up and form an unique pattern for each word.

For some multi-syllabic words, adopt omitted sound and tone form. For a few high-frequency multiple syllabic words, adopt the unified omitted-spelling form; List each first letter of a word when doing omitted-spelling, if the omitted-spelling form has a conflict with another omitted-spelling word or other syllables, select other letters of the original word instead of the first letter; The omitted-spelling multiple syllabic word is tone mark omitted, every combination of letters can only have one omitted-sound and omitted-tone word, can't be confused with other ordinary spelling syllables, and also try not to conflict with international popular abbreviations. For instance:

你好nh, 谢谢ss, 对不起dbc, 没关系mgs, 我们um, 你们nm, 他们tm, 人们rm, 女士们nsm, 先生们sgm, 同志们tzm, 同学们tsm, 先生sg, 小姐aj, 女士ns, 夫人fr, 同志tz, 同学ts, 爷爷ii, 奶奶nn, 爸爸bb, 妈妈mm, 哥哥gg, 姐姐jj, 弟弟dd, 妹妹ee, 宝宝aa, 父亲fc, 母亲mc, 亲爱的cad, 敬爱的jad, 尊敬的zjd, 例如lr, 等等dg, 大约dy, 平均pj, 年级nj, 公司ggs, 集团jtn, 有限公司isgs, 出版社cbs, 说明书sms, 集团军jtj, 电话dh, 传真cz, 分机(转) fj, 免费热线电话mfrs, 公用电话gydh, 办公电话bgdh, 住家电话zjdh, 手机ej, 邮政信箱izss, 电子邮箱dzis, 电子邮件dzij, 电视(机) dsj, 电脑dn, 光碟gd, 网址uz, 春季cj, 夏季sj, 秋季hj, 冬季dj, 前天ct, 昨天zt, 今天jt, 明天mt, 后天ht, 凌晨l.n., 清晨c.n., 早晨z.n., 上午a.u., 中午z.u., 下午s.u., 早上z.s., 晚上u.s., 星期一scl, 星期六sc6, 星期天sct., 总统ztg, 主席zsh, 总理zgl, 国务卿guc, 部长bzr, 首相ssg, 大臣dcr, 元帅yns, 将军jjn, 国王gug, 女皇nhg, 皇帝hgd, 博士bsr, 硕士ssr, 学士shs: 圆形ysh, 椭圆形tysh, 半圆形bysh, 长方形cfsh, 正方形zfsh, 三角形sjsh, 扇形ssh, 拱形gsh, 梯形tsh, 弧形hsh, 长方体cfti, 正方体zfti, 圆柱体yzti, 圆锥体yrti.

For the abbreviations of the weight and measure units, add periods according to the usage of English, adopt Chinese pronunciation: such as 米m., 千米km., 厘米cm., 毫米mm., 克g., 千克kg., 毫克mg., 升l., 毫升ml., 公顷ha., 英里mi., 英尺ft., 英寸in., 吨tn., 磅lb., 盎司oz., 平方米m2, 立方米m3, 平方英寸in2, 公斤/立方米kg./m3.

When an abbreviation of the weight or measure unit meets a period, the period is not omitted.

When area code figures of telephone and fax or symbol of number, etc. are in brackets, no blank space between the brackets; After closing brackets, one space followed by figures or symbols; No blank before and after the hyphen. For instance:

Dh: (010) 111-1111/Cz: (010) 111-1112/Mfrs: 1-800-111-1111; "星期六晚上八点/eight o'clock at night on Saturday" used as "sc6 u.s. 8:00". "三月份/ March" used as "3y", "三个月/three months" used as "3g yex".

The letters of the omitted-sound and omitted-tone terminology words should be capitalized, list first letter of each character but not exceed 4 letters. For instance:

中国ZG, 中国人ZGR, 华人HR, 华语HY, 华文HN, 中华民族ZHMZ, 万里长城ULCC, 中国中央电视台ZZDS, 龚氏拼音GP.

If the spelling form has conflict with other spelling words or other syllables, one can select other letters of the original word instead of the first letter of the omitted-spelling word.

When a title is used with a name of a country at the same time, the title and preceding terminology are joined with a hyphen, for instance:

"Germany-zgl (德国总理/German Premier), USA Sraguxbux-fbz (美国商务部副部长/Vice-minister of American Department of Commerce), Japan Uaixux-dcr (日本外务大臣/Japanese foreign minister)".

For all the provincial names and urban names, use their original Latin names, and mark with Chinese pronunciation in the following brackets while needed.

For some monosyllabic measure words (classifiers), use omitted sound and tone form. For instance:

部b, 片p, 名m, 份f, 道d, 天t, 年n, 类l, 个g, 口k, 盒h, 件j, 日r, 组z, 次c, 岁s, 条a, 所o, 本e, 页i, 位u, 月y etc.

The simple spelling monosyllabic measure word which corresponds to a Chinese character can't have the same spelling as other simple spelling monosyllabic word, such as the monosyllabic measure word "day" can spell as "t", for non-monosyllabic measure word it is no longer spelled as "t" or "tian". Use Arabic numeral for the number before the measure word, and write it together with the measure word. For instance:

四个人→4g renv, 十三匹马→13piv maw, 七十八台电脑→78taiv dn.

While for idioms, names of people, places, mountains and rivers, adopt the spelling form of the Chinese-language figures, for instance: 王五→Uagv Uw, 阿三→Aq Sanq, 十里堡→Srvliwpux For measure words of date (year, month, day), adopt simple spelling monosyllabic form, write together with relevant Arabic numeral, for instance: March 7, 2001→2001n3y7r, August of 1931→1931n8y, May 13→5y13r, 1982→1982n.

Demonstrative pronoun: "这, 那, 这些, 那些/this, that, these, those", interrogative pronoun: "哪, 哪些/which", indefinite pronoun: "每, 某, 几, 各, 其他, 任何, 许多, 所有/every, some, several, each, other, any, much, all", approximate number: "many, few" etc., can write together with the matching measure word. For instance:

某期meuwch, 各个gvg, 每一天meiw1t, 那些年naxsheqn, 这五首zrex5sr, 一小间1shauwjanq, 几十部jw10b, 十多位10duoqu, etc.

Because of closely following the Arabic numerals or pronouns, the measure words can't cause any confusion with other simple spelling word. Such as "c (从/from)", "c (次/times)", the simple spelling form "c(从/from)" has the same spelling with the measure word "c (次/times)", but "T c uaixdi lai (他从外地来/he come from other places)" can't get confused with "c" of "meiwc (每次/each time)".

Instead of "第", "#" is added for ordinal numerals (pronounced "dix" when needed according to the Chinese language custom), followed by Arabic numeral and measure word, such as #7t (第七天/the seventh day), #4nj (四年级/grade four), #33jtj (三十三集团军/the 33rd group army).

When "的" is after another word to consist of possessive pronoun, write in succession, such as ud (我的/my), nd (你的/yours), td (他的/his), tavd (她的/hers), taxd (它的/its), sreivd (谁的/whose), zjd (自己的/one's own), umd (我们的/ours), nmd (你们的/yours), tmd (他们的/theirs), tavmd (她们的/theirs), taxmd (它们的/theirs), djd (大家的/everyone's).

When used as auxiliary word after the attribute, it is written separately, such as piauxliagx d (漂亮的/beautiful), sregqmigx d (生命的/alive), If more than one word before it and it is written separately, such as guoxfenx huavlix d (棒/too much magnificent), Taixsranq rxcr d (pən/the sunrise of Mount Tai). If proper noun word or omitted spelling word before it and it is written separately, such as Mary d (Mary's), LHG d (联合国的/ the United Nation's). If used in the end of a declarative sentence, it is written separately.

When "地" is used as an auxiliary after an adverbial modifier, it is written separately, such as janxjanx di (渐渐地/gradually), hvliw di (合理地/rationally), If more than one word before it or omitted spelling word before it, is written separately, such as 1bux 1g jauwinx di (一步一个脚印地/on a firm footing), sgcl di (兴高采烈地/excitedly).

When "得" is used after a verb or an adjective, or before a complement, it is written separately, such as hauw dei henw (好得很/very good), hq dei tugxkuaix (喝得痛快/drink delightedly), If more than one word before it or omitted spelling word before it, it is written separately, such as T shigqfenx chyexyex dv shagx 1g haivz' (他兴奋、雀跃得像个孩子/ his excitement, gambol like a child).

In order for people to read and understand, "&" (voiceless here) can be used to connect the words in which meanings stand side by side ("&" means "and"), no blank space before or after the words to keep the words fullness of the multiple syllables, such as fx&nyw (父女), shugq&dix (兄弟), unx&dav (问答), gagq&tiew (钢铁), 8&9t (八九天), 17&18s (十七八岁), renv&jq duixhuax (人机对话).

Idioms or phrases with four or more characters can be divided into a lot of syllables to pronounce, add hyphen if necessary, for instance:

guovjxzruwix-renvunvguanq (国际主义人文观/Humane view of internationalism). Sometimes two kinds of symbols need to be used simultaneously, for instance: zr&shau-shyev (中小学) lux&haiw&kugq-jynq (陆海空军).

According to the habit of Chinese people, while spelling a Chinese name, write surname before the first name; Write in joining syllable if having more than one character. The spelling should be like this:

Uagv (王英), Leiv Jigxsugq (雷劲松), Sqtuv Sheuxhuav (司徒秀华).

Sometimes when we read a Chinese name translated in some foreign language articles (which noted sound translation), but we don't know which original Chinese character(s) corresponded. When we see the surname "Lu" in Hanyu Pinyin, but don't know which one is the corresponding Chinese character "卢, 芦, 庐, 鲁, 陆, 鹿, 逯, 禄, 路, 吕, 律". Even more, there are some cases: because of the same transliteration for different Chinese names, wrong people were caught by police when they passed customs in foreign countries. If inserting the Chinese character(s) in the Latin alphabet spelling, will would destroy the unity of the whole letter spelling of a text, and violate people's psychological habit. For specific words which need to distinguish clearly, such as names of people, mountains and rivers, ancient Chinese prose words and quoted expressions, etc., Gugq's Chinese Spelling marking form adopts to adding "code note" (which means to mark according to the inside code of Chinese character collections such as GBK), namely add code notes for a specific word. The code can be shown in time and it is convenient for consulting. The capital and lowercase letter of a code note and the way of joining writing of the divided syllables should be strictly kept unanimity with the marked original spelling of each monosyllable.

To avoid interfering with the continuity of writing and pronouncing of a word, the code note is entirely after the word. In choosing code notes, words with two or three characters can be used a hyphen to distinguish the fact, such as (-D335), (-H556). If needing to confirm the corresponding Chinese character, put the cursor on the code, utilize the function of toggling the display of the modes and find the Chinese character; One also can use the coding schedule to consult, or skip when not needing. For instance, the name of the inventor in Chinese character is "龚学胜", in Hanyu Pinyin is "Gong Xuesheng" and in Gugq's Chinese Spelling mark form with the code note is "Gugq Shyevsregx B9A8 D1A7 CAA4" (The code note is according to GBK collections). Code notes can be used extensively for passports, other kinds of identity documents, foreign letters and publications of Chinese name spellings, etc. Among Gugq's Alphabetic Writing form, words already split up and form an unique pattern for each word don't need any code note. For the same words necessarily marked with code notes, usually annotate while appearing for the first time only. Before the name of a county or a city that appears for the first time in a article, mark the province name, mark the province name and the county or city name before the name under a county or a city, annotate zip codes in brackets if necessary.

The first letter of a sentence, every line of a poem or each thesis outline is capitalized; The first letters of proper names, such as names of people, places, mountains, rivers, organizations, etc. are capitalized; The names of books, newspapers and periodicals, movies & TV & dramas, articles, poems and arts, etc. are used in italics; The emphasized or illustrated words are used in italics; In court cases, the name of an original defendant is used in italics; The first line of each paragraph is not indented; Use a blank line between paragraphs; Use a hyphen to divide a word at the end of a line when the end of the word is moved into the next line. The first letter of each word of the quoted ancient poetry or classical Chinese writing etc. is capitalized (make note in the vernacular or add code note if needed), such as: Chanqliw Zrq Shigv, Srwyv Zuv Shax (千里之行, 始于足下). When a repeated monosyllable follows in a word, use "~" to replace it, such as: tianq~ (天天), rx~iex~ 日日夜夜).

Adopt all English punctuation marks and the written forms. The Chinese symbols such as slight-pause mark (、), mark for emphasis (.), separation mark (•), punctuation mark used to enclose the title (<< >>), a proper noun mark (_), etc., are non-existent in English. In order to make alphabetic writing of Chinese possible everywhere without any hindrance through an English keyboard, adopt all the English punctuation marks and written forms such as express a period with a dot (Chinese expresses period with a little circle), replace a slight-pause mark with a comma, show italics for the punctuation marks used to enclose a title, capitalize the first letter of a proper name, express a separation dot with a blank, mark with an underline for emphasis.

In principle, use the original Latin alphabet form as the spelling for the proper names, such as names of countries, people, places, mountains and rivers beyond the Chinese language, or the professional nouns of mathematics, physics, chemistry, biology etc., and annotate the pronunciation in brackets in Chinese spelling if necessary. Use Chinese spelling for the attributed names, such as Toronto Dawshyev (多伦多大学/University of Toronto).

For transnational organizations, international bodies, continents, oceans, etc. use the full names or abbreviations of Chinese, for instance LHG (联合国/the United Nations), EM (欧盟/European Union), LHZ (绿色和平组织/Green Peace Organization), etc.

Adopt the abbreviation symbols from the Latin alphabet for chemical element names, but use the Chinese pronunciations, such as: Au (gold), Ag (silver), Cu (copper), Fe (iron), Al (aluminum), Pb (lead), C (carbon), O (oxygen), H (hydrogen), etc., for instance:

"由氧、铁等元素组成/made up elements, such as oxygen, iron, etc.".

the alphabetic writing is "Iuv O, Fe degw yanvsux zuwcregv". For the province names or places of Chinese language use the full name in principle, do not use any slang name, e.g. Hevbeiw Province, not "Jx冀", The common nouns and proper nouns partly relevant with: "花、草、树、木、鸟、虫、鱼、兽、石、山、河、湖、海、岛、渠、泉/flower, grass, tree, wood, bird, insect, fish, animal, stone, mountain, river, lake, sea, island, canal, spring" etc., should be followed by the above characteristic nouns to make a word in Gugq's Alphabetic Writing to discern. According to the habit of the Chinese character, some words with "鱼" part can be used independently or collocated with "鱼" together to express the same meaning (the same kind of fish), such as "鲨、鲨鱼 shark", "鳄、鳄鱼 crocodile", "鲟、鲟鱼 sturgeon".

but can't use independently in the alphabetic writing. "邛崃" is showing a mountain, Chugvlaiv Sranq "邛崃山" should be used instead in the alphabetic writing.

Try to reduce the redundant expressions as much as possible to form a scientific, simple, standard Chinese pattern series without ambiguity. In a general answer of an interrogative sentence, use a simple positive answer:

"S (是/Yes), I (有/Have)"

and a simple negative answer:

"B (不/No), M (没/Haven't)"

in the beginning, so that a listener can get a simple, direct and clear reply with a mode unified as soon as possible. For instance:

N shagw crq dian shagqjauq ma'? (你想吃点香蕉吗?/Do you want to have some bananas?)

S, ch ba'. (是, 请吧。/Yes, Please.) or B, ss. (不, 谢谢。/No, thanks.)

U negv dawkaiq ds ma'? (我能打开电视吗?/Can i turn on the TV?)

S, ch ba'. (是, 请吧。/Yes, Please.) or B, dbc. (不, 对不起。/No, I am sorry.)

Zre fagvjanq dt i nuanwchx ma'? (这房间冬天有暖气吗?/ Are there heating systems in winter in this room?)

I. (有。/Yes.) or M. (没。/No.)

In various kinds of statistics in questionnaires or investigations, choose

"S/B" (是Yes/不No) as an answer form. In an interrogative sentence, if using the interrogative pronoun or interrogative adverb at beginning such as: "Sreiv (谁/who), Sreivd (谁的/whose), Srenvme' (什么/what), Naw (哪/which, can be followed by a measure word), Nawli (哪里/where), Hvsrv (何时/when), Uixhv (为何/why), Zenwme' (怎么/how), Duoqsrau (多少/how much)", would let the person realize ahead of time in the question and plan to answer. For instance:

Sreiv s dagqjing igqshygv? (谁是当今英雄?/ Who is the current hero?)

Sreivd ej fagxz zruoqz'sr? (谁的手机放在桌子上?/Whose cell phone is put on the desk?)

Srenvme' tzv zuix shwhuanq crq? (什么她最喜欢吃?/What does she like eating most?)

Naw liex huowcreq kaiquag Shagqgagw? (哪列火车开往香港?/Which train leaves for Hong Kong?)

Hvsrv tm negv uanvcregv? (何时他们能完成?/When can they finish?)

Uixhv nd lianw hugvl? (为何你的脸红了?/Why do you blush?)

Zenwme' caivnegv zrunwsrv dauxdav? (怎么才能准时到达?/How could I arrive on time?)

Duoqsrau chanv taiv dn? (多少钱这台电脑?/How much is this computer?)

If needed in publications such as the teaching materials, or books for children, etc., use many kinds of methods to increase the parallax between the sound letters and the tone letters through computer programs (no manual intervention); The tone letters can be marked in upper right corner (the unstressed tone mark unchanged) e.g.

Huax fuwsheuw uix srenvchv (化腐朽为神奇).

Use different colors among colored publications for the sound letters and tone letters; When new symbols are needed as identification, give a priority to use the symbols which have been used by commonly used keyboard such as:

^, |, ~, , /, \, etc.

For the Chinese grammar term words add periods after the italics: Such as

"m. (名词/noun), da. (代词/pronoun), d. (动词/verb), s. (形容词/adjective), f. (副词/averb), su. (数词/numeral), I. (量词/measure word), fg. (方位词/noun of locality), j. (介词/preposition), In. (连词/conjunction), z. (助词/auxiliary word), t. (叹词/interjection), n. (拟声词/onomotopoeia), g. (冠词/article; zy. (主语/Subject), uy. (谓语/predicate), bny. (宾语/object), bay. (表语/predicative), dy. (定语/attribute), zgy. (状语/adverbial modifier), buy. (补语/complement)". Also add periods after the italics; Such as "jn. (近义词/near synonym), fn. (反义词/antonym), ju. (又/also), cby. (区别于/discriminate from), id. (又读/can be also read as), ftz. (繁体字/traditional characters), jhz. (简化字/simplified characters), ssz. (姓氏用字/characters for surnames), rmz. (人名用字/characters for people' names), dmz. (地名用字/characters for places), imz. (译名用字/characters for name translation)".

For the figures of Chinese characters which show the amount of a currency (e.g. write a check), adopt the fully spelling form with tone mark letters: iq (壹/one), erx (贰/two), sanq (叁/three), sx (肆/four), uw (伍/five), liux (陆/six) chq (柒/seven), baq (z,1085 /eight), jeuw (玖/nine), srv (拾/ten), baiw (佰/hundred), chanq (仟/thousand), uanx (籍/ten thousand), ix (亿/hundred million), zregw (因/whole), ligv (零/zero). For instance: 玖拾贰元整(Ninety Two Yuan exactly), written as "RMB ¥Jeuwsrv Erxyanv Zregw"; 叁仟伍佰零捌元柒角肆分(Three Thousand Five Hundred Eight Yuan Seventy Four Cents), written as "RMB¥Sanqchanq Uwbaiw Ligv Baqyanv 74/100").

Change "beginning with Chinese Characters" into "beginning with the Chinese spelling" for the traditional Chinese dictionaries, change the main body of the Chinese dictionaries according to the essential meanings from focusing on "characters" into "words". In the dictionaries beginning with the Chinese spelling, a monosyllabic word doesn't correspond to the "character" of non-monosyllabic word, such as "蚭, 璃, 尬", etc. no longer appear under the Chinese spelling of monosyllabic words. The characters which appear under the monosyllabic words, can't be shown any "non-monosyllabic meanings", and can be interpreted alone as a prefix or suffix for some strong word-building non-monosyllabic meanings if necessary. Divide and confirm a monosyllabic word or disyllabic or polysyllabic words according to the Chinese alphabetic writing rule. For the special-purpose characters such as a surname, a person's name, or a name of a place in a dictionary text, do not give any explanations and collect them in appendix. For the monosyllabic meaning that is not selected, split up according to the tone or the closest sound, sort to another monosyllabic words, or use as a disyllabic or polysyllabic word with a combination. In a dictionary text all characters are "one sound one tone monosyllabic word" (Namely the sound and tone of each monosyllabic character is sole). The following between vertical lines is the corresponding Chinese character:

diuq d. 遗失：失去。 bux f. 否定。m. 用棉、麻等织成的材料。l. 行走时两脚间的距离。 ruix s. 尖利的(fn. 钝) ： 尖~/敏~。 f. 快速地；急剧地：~进/~增/~减。

The method is also suitable for Chinese dictionaries marked with other spelling forms (such as using "x," standing for adjective in Hanyu Pinyin).

In a dictionary, if a monosyllable can only be used in one word, no matter which location it is, give the explanation under the word, which is the best way for user's consulting:

ranw (renwranw) (荏苒)
d. (时光)渐渐流逝：韶光~,转瞬又是一年。

The surnames or prover nouns of people, places etc. which are compiled into appendixes are not explained in the main body of a dictionary. All the surnames are listed in the appendixes, the divided sound and tone monosyllables in the main body of a dictionary do not affect the surname pronunciations. Use both the inside front cover lining and the inside back cover lining (the most convenient pages) as indexes in which the contents should be the most relevant to the dictionary. Use the inside front cover lining as syllabic index and the inside back cover lining as radical index if the words are listed by the order of spelling.

字音 姓氏用字 人名用字 地名用字
binq 宾滨 斌彬宾滨邠镔傧槟玢璸缤颁 邠豳
piv 皮陂郫
rugv 荣戎容融 荣蓉容融榕戎嵘 珞镕溶嫆绒茸 彭烙绒

In order to make a word, spelling, code to merge each other, namely there are sound, code in the word (including the word), there are word, code in the sound, there are word, sound in the code, the three require to be displayed simultaneously at first. It's easy to utilize existing programming technology to accomplish this. When needing to search for code information for words or syllables, put the cursor in the selected syllables, namely show the information such as shape, code in conformity with this word, spelling, tone, etc. Information frame (bar) can be set up unmoved or moved with cursor, a user can choose according to the need. When there are a lot of words, arrange according to frequency. Such as "pianvzrq: 胼胝(EBDD EBD5)".

On the contrary, putting the cursor to the selected words, can very easily show spelling, code in conformity with these words. Such as "胼胝: pianvzrq (EBDD EBD5)". "EBDD EBD5: 胼胝(pianvzrq)".

Users can open or close this function at any time according to the need.

In contemporary Chinese, the figures of the monosyllabic words are about 2,500, and if spelling with 415 syllables, there are lots of words with the same shape (repeated code). The commonly used contemporary Chinese vocabularies have about 50,000, if spelling these 50,000 words with 415 syllable forms, there are about 15,000 words with the same shape, the proportion is 30%; If spelling in the form of about 1,350 syllables (with tone) and there are about 4,000 words with the same shape, the proportion is 8%. Therefore, even if spelling with tone marks, there is still a very high proportion of the same shape words. A language with a higher degree of finalized design is only about 3% in proportion with the same shape words.

In the transformation from meaning character system to sound character system, normally some words with the same sound and tone would appear. But if appropriate scientific methods are adapted to split them up, and to keep them in a rational range, the same shape words in alphabetic writing would be distinguishable and would not cause any confusion in use. Among the same sound and same tone words the monosyllabic and disyllabic words are in high proportion, the proportion of the same sound and same tone is very low among the words above three syllables.

The Chinese alphabetic writing schemes which appeared in the past, mostly split up and form an unique pattern for each word by spelling in different ways, namely the same sound and same tone syllable adopted many kinds of spelling ways, for instance: cao, using different spelling ways to split up and form an unique pattern with cau, caw, tsao, tsau, tsow, tzao, tzau, tzaw, ccao, ccau, ccaw, etc. Some schemes used dozens of different spelling forms to split up and form an unique pattern for each word for several tens of thousands of characters, words and phrases of the Chinese language. If every character or a word is manmade and designated, it's a significant burden that learners get forced to remember.

In order to reduce the burden on the memory for people to study and use the alphabetic writing of Chinese, Gugq's Chinese Alphabetic Writing can split up and form an unique pattern for each word effectively without using different letters to make up combination spelling to discriminate the same sound and the same tone words, and offers a loose interface for learners and users. Relevant researches prove that Gugq's Chinese Spelling can mark tones with regular letters, make changes according to specific conditions to the redundant expressions of Chinese words, and adopt other rational, scientific, simple and easy methods to split up the words and form an unique pattern for each word, so it can split up and form an unique pattern for all of the Chinese contemporary words and phrases effectively without using different letters combination spelling.

The tone splits up. The tones of Chinese spelling are distributed unbalanced. There are lots of the same tone words in a certain tone, but there is not a single word in another tone. Tones split up according to a principle on "use the method to keep the original tone for the high-frequency words of the original same sound and same tone words, convert the tone for the secondary high-frequency words, low frequency words are transferred to the usage; The transferred sound words can not produce new confusion". Make it a priority to inter-convert between the first and second tone or the third and fourth tone, only change the tone of apt converted words.

The sound splits up. If it is difficult to carry on the tone splitting up, then keep the original sound for the high-frequency words of the original same sound and same tone words, convert the sound for the secondary high-frequency words, low frequency words are transferred to the usage; give a priority to inter-convert between the closer sounds of words; The converted sound words can't produce any new confusion. Convert the words each other between the relevant retroflex and flat tongue words, between the relevant voiceless sound and voiced sound; In Gugq's Chinese Spelling, Z and ZR, C and CR, S and SR, B and P, IN and IG, N and L, U and UO, EI and UI etc. are the relevant sounds.

Change words to split up. If it is difficult to carry on the tone and sound of words to split up, keep the original usage for the high-frequency words of the original same sound and same tone words, convert the usage for the secondary high-frequency words and low frequency words. Keep the original usage for the difficult converted words, convert the usage for the easily converted words, give a priority to convert the words being used at the present time, the converted words can't produce any new confusion.

For lots of characters which have a low word-building rate of usage and share "the same commonly used part", utilize in a way of sharing the same part to make up disyllabic or polysyllabic words, it can reduce the quantity of characters and on the other hand can foster a user's ability of abstract thinking; For instance:

"滨缤傧殡鬓槟"share the part "宾", can be used by way of disyllabic or polysyllabic words "海宾, 宾纷, 宾相, 出宾, 宾发, 宾榔". For another example: "课碟蝶喋堞牒鲽" share the part "枼", used by way of disyllabic or polysyllabic words "间枼, 枼子, 胡枼, 枼血, 墙枼, 史枼, 枼鱼".

Use complete words and phrases instead of abbreviated words and phrases to split up. There are certain differences between Chinese characters and Chinese spelling words. Because some different words of Chinese characters have become homonym in spelling words while using the alphabetic writing, try to avoid using abbreviated words which are difficult to understand, use the intact words instead. Such as the abbreviated word 美院readers do not know whether it is "美容院Beauty parlor", or "美发院 Hair dresser" or "美术学院 Academy of fine arts", the intact words and phrases which used the latter instead would not be misunderstood.

Transfer a monosyllable to a disyllabic word to split up. There are lots of monosyllabic words with the same sound and the same tone in the Chinese language, transfer them to the disyllabic words to split up if there is ambiguity. Use symbols to split up. Through adding different symbols in the words and phrases, can split up the spelling form partly, such as "妇女 woman—fxnyw" and "父女 father and daughter—fx&nyw", "权力 power—chyanvlix" and "权利 right—chyanv&lix".

Synthetically use many kinds of methods to split up complicatedly. Among the same sound words 机理, 肌理,曁吉利, 蒺藜, 几粒 , 祭礼,", the word "机理" has the same tone as "肌理", "肌理" is a low frequency word, used as "肌肤". The word "极力" has the same tone as "吉利", but they are difficult to get confused according to context. All of the words and sentences in contemporary Chinese can be split up effectively in Gugq's Chinese Alphabetic Writing. As usual example sentence:

妇女二人谈枇杷(Two women discuss the loquat) →Fxnyw 2renv tan pivba'; 父女二人弹琵琶(Father and daughter play the pipa) → Fx&nyw 2renv tanv pivpa'.

At present the phonetic notation system used by the commonly international languages such as English, etc. are IPA, KK, Webster and Oxford, etc. For stating, the following uses IPA before Gugq's for contrasting (Please see FIG. 3). The overall scheme of Gugq's Phonetic Symbols doesn't go beyond the range of 26 letters in commonly used English keyboard. Which will not be confused or read by mistakes between all phonetic symbols. When the letter identification of the existing phonetic symbol is in conformity with commonly used English keyboard, the letter identification does not change, such as B, P, TS, DZ, etc.

When the letter identification with phonetic symbol is not in conformity with the commonly used English keyboard, Gugq's Phonetic Symbols gives priority to use of the single letter identification form which is close relatively to the pronouncing phoneme at the picture in phonetic symbol, or which has the corresponding spelling form, such as: [ɪ→[i], [v]→[u], [ʊ]→[a], [tʃ]→[q], [ʃ]→[x]. In phonetic symbols, [ə] is higher in frequency of utilization than [e/ɛ], Gugq's scheme uses [ə]→[e].

When the letter identification with phonetic symbol is not in conformity with English letters in common used keyboard, and hasn't individual corresponding letter in English keyboard, use the combination form under three letters, for instance: [ə(r)]→[er], [ɔ:(r)]→[or], [ɑ:(r)]→[ar], [eɪ→[ei], [aɪ]→[ai], [əʊ]→[eu], [aʊ]→[au], [ɪə(r)]→[au], [ʊə(r)]→[ur], [aɪə(r)]→[air], [aʊə(r)]→[aur], [ju:]→[juu], [jʊə(r)]→[jur]. The long vowels with colons are written with pairs, for instance: [i:]→[ii], [ɔ:]→[oo], [ɜ::]→[ee], [ɑ:]→[aa], [u:]→[uu].

In the popular languages, such as English, etc., the phonetic symbol of "C", "K" is all here in [k], therefore "C" is getting idle, and can be used to make other phonetic symbols. In Gugq's Phonetic Symbols "C" is collocated with other letters as the vowels: [æ]→[ac], [ʌ]→[oc], [e/ɛ]→[ec], [eeə(r)]→[ecr].

Mark the stressed syllable with the accent mark in commonly used English keyboard, the second accent is not marked. In the reference books, such as dictionaries, etc., mark the phonetic symbol within the slants, such as: sandwich /'sacnwij/; In the reference books and children's books, the stressed syllables should be totally marked, e.g. seu 'iiven dheu wii feis dhe 'difikeltiz ov te'dei end te'moreu. But in the other phonetic writings, if the stress is in the last second syllable, omit the accent mark, e.g. seu iiven dheu wii feis dhe 'difikeltiz ov te'dei end temoreu. In articles or other usages, mark the phonetic symbol within the square brackets, for instance: father ]'faadher].

Using Gugq's Phonetic Symbols, users can make the whole article phonetically symbolized. When symbolizing, keep the capital and lowercase letters of phonetic symbols in conformity with the original text. The following is the identification for the English paragraph of "I Have a Dream" of Martin Luther King, with the corresponding of Gugq's Phonetic Symbols, the Chinese character and Gugq's Chinese Alphabetic Writing:

I say to you today, my friends, so even though we face the difficulties of today and tomorrow, I still have a dream. It is a dream deeply rooted in the American dream. I have a dream that one day this nation will rise up and live out the true meaning of its creed: "We hold these truths to be self-evident—that all men are created equal."

Ai sei te juu tedei, mai frendz, seu iiven dheu wii feis dhe difikeltiz ov tedei end te moreu, Ai stil hacv e driim. It iz e driim diipli ruutid in dhe Emecriken driim. Ai hacv e driim dhact wocn dei dhis neishen wil raiz ocp end liv aut dhe truu miining ev its kriid: "Wii hold dhiiz truuths te bi self-ecvident—dhact ool mecn a krieitid iikwel."

"朋友们,今天我要对你们说。尽管今天和明天困难重重,但我依然怀有一个梦。这个梦深植于美国梦之中。我梦想有一天,这个国家将会奋起,实现其立国信条的真谛:"我们认为这些真理不言而喻——人人生而平等。""

Pim, jt u iaux duix nm sruoq, jg jt h mt kunxnanvcrugvcrugv, ds u iqranv huaivi lg mugx. Zrexg mugx srenqsrenqdi zraqgenqy American mugx zz. U mugxshagw ilt, zrexg guovjaq jagq huix fenxchw, srqshanx chv lixguov shinxtiauv d zrenqdix: "Um renxuiv zresheq zrenqliw buxianvervyx—Renv~Sregq E Pigvdegw."

What is claimed is:

1. A computer-implemented Chinese spelling scheme on a keyboard, comprising:
   a. using special-purpose letters for marking tones wherein the spelling form is in conformity with the international phonetic symbols and the corresponding Latin alphabet;
   b. wherein the letters used for spelling and tone marks do not go beyond the range of 26 English letters except unstressed tone mark; and
   c. using "replacement-sequencing-retrieval" (RSR) to arrange words in order.

2. The scheme of claim 1, further comprising using Q, V, W, and X as unique Chinese tone marks (using ' as the unstressed tone mark), wherein each tone mark follows each monosyllable.

3. The scheme of claim 1, further comprising using the following to replace Hanyu Pinyin spelling:
Ü→Y, AO→AU, OU→EU, ONG→UNG, Q→CH, X→SH, ZH→ZR, CH→CR, SH→SR.

4. The scheme of claim 1, wherein all initial consonants and vowels form syllables independently:
YI→I, WU→U, YIN→IN, WEN→UN, YUN→YN, YONG→YNG, ZH→ZR, CH→CR, SH→SR, RI→R, ZI→Z, CI→C, SI→S.

5. The scheme of claim 1, wherein when -NG follows behind a vowel letter and together consists of a compound vowel of a syllable, omit and replace with 'G': ANG→AG, ENG→EG, ING→IG, UNG→UG, YNG→YG.

6. The scheme of claim 1, wherein all vowel letters followed by -N, -G, together consist of compound vowel form and correspond one on one with the international phonetic symbols:
   a [a] (啊) - an [an] (安) - ag [aŋ] (昂);
   e [ə] (鹅) - en [ən] (恩) - eg [əŋ] (鞥);
   i [i] (衣) - in [in] (因) - ig [iŋ] (英);
   u [u] (乌) - un [un] (温) - ug [uŋ] (翁);
   y [y] (迂) - yn [yn] (晕) - yg [yŋ] (雍);

7. The scheme of claim 1, wherein RSR consists of:
   a. neglect the tone letter for the main key word and consider the tone letter in secondary key word when arranging words in an order;
   b. for the syllables of beginning with pairs of initial consonants (CH, SH, ZR, CR, SR), rank them together and also give consideration to tones: (1) replacing in the order of Q→1, V→2, W→3, X→4, CH→CWH, CR→CXR, SH→SWH, SR→SXR, ZR→ZXR; (2) sequencing; (3) retrieving in an order according to CWH→CH, CXR→CR, SWH→SH, SXR→SR, ZXR→ZR, 1→Q, 2→V, 3→W, 4→X;
   c. for index of syllables, use the order: A, B, C, Ch, Cr, D, E, F, G, H, I, J, K, L, M, N, O, P, R, S, Sh, Sr, T, U, Y, Z, Zr.

8. A computer-implemented scheme of Chinese alphabetic writing, comprising:
  a. applying a sound and tone letter omitted spelling method to those characters with high-frequency monosyllabic meanings;
  b. an abbreviating method for the terminology words and grammar words;
  c. wherein for specific characters in all kinds of identifications or in articles needing to be distinguished, such as names of people, places, mountains, rivers, etc., applying a method of adding a Chinese "code note".

9. The scheme of claim 8, wherein the sound and tone-letter omitted spelling method comprises:
  不b, 从c, 的d, 而e, 和h, 有I, 就j, 可k, 了l, 没m, 你n, 说o, 如r, 是s, 他t, 我u, 于y, 在z, etc.

10. The scheme of claim 8, wherein the abbreviating method consists of when there are abbreviated letters of terminology words, list maximum 4 letters and capitalize them and when a conflict meets with other spelling word or other syllables, select other letters from the original spelling word:
  中国ZG, 中国人ZGR, 华人HR, 华语HY, 华文HN, 中华民族ZHMZ, 万里长城ULCC, 中国中央电视台ZZDS, 龚氏拼音GP, etc.

11. The scheme of claim 8, wherein a Chinese grammar word is used with italics and followed by a period as follows:
  "m. (名词/noun), d. (动词/verb), s. (形容词/adjective), f. (副词/adverb), tc. (同义词/synonym), jc. (近义词/near synonym), fc. (反义词/antonym), etc.

12. The scheme of claim 8, wherein said method of adding a "code note" comprises:
adding a "code note" according to Chinese internal code specification (GBK).

13. A computer-implemented scheme of phonetic symbols, comprising: using 26 English letters as phonetic symbols, wherein:

a. when the letter identifications of the existing phonetic symbols are in conformity with the English letters in commonly used keyboard, keep the identifications (B, P, TS, DZ, etc.);
  b. when the letter identifications of the existing phonetic symbols are not in conformity with the English letters in a commonly used keyboard, use the single letter identification form which is relative to the pronouncing phoneme at the picture or which has the corresponding spelling: ([ɪ]→[i], [ʊ]→[u], [v]→[a], [tʃ]→[q], [ʃ]→[x]), [ə]→[e].
  c. when the letter identification is not in conformity with the English letter in commonly used keyboard, and does not have an individual corresponding letter, use the combination under three letters:

[ə(r)]→[er], [ɔ:(r)]→[or], [ʊ:(r)]→[ar], [eɪ]→[ei], [aɪ]→[ai], [əʊ]→[eu], [aʊ]→[au], [ɪə(r)]→[ir], [ʊə(r)]→[ur], [aɪə(r)]→[air], [aʊə(r)]→[aur], [ju:]→[juu], [jʊə(r)]→[jur].

14. The scheme of claim 13, wherein said the long vowels with colons are replaced with pairs:
[i:]→[ii], [ɔ:]→[oo], [ɜ:]→[ee], [ɒ:]→[aa], [u:]→[uu].

15. The scheme of claim 13, wherein said using "C" to collate with other letters to form vowels:
[æ]→[ac], [ʌ]→[oc], [e/ɛ]→[ec], [eə(r)]→[ecr].

16. The scheme of claim 13, wherein marking the stressed syllable with the accent mark in commonly used English keyboard, the second accent is not marked.

17. The scheme of claim 13, wherein said when symbolizing, keep the capital and lowercase letters in conformity with the original text.

\* \* \* \* \*